United States Patent
Saeki

(10) Patent No.: US 11,843,612 B2
(45) Date of Patent: Dec. 12, 2023

(54) COMMUNICATION DEVICE MANAGEMENT DEVICE, SYSTEM, METHOD, AND NON-TRANSITORY COMPUTER-READABLE RECORDING MEDIUM

(71) Applicant: NEC Corporation, Tokyo (JP)

(72) Inventor: Eriko Saeki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 419 days.

(21) Appl. No.: 17/259,769

(22) PCT Filed: Jul. 22, 2019

(86) PCT No.: PCT/JP2019/028640
§ 371 (c)(1),
(2) Date: Jan. 12, 2021

(87) PCT Pub. No.: WO2020/022257
PCT Pub. Date: Jan. 30, 2020

(65) Prior Publication Data
US 2021/0344684 A1 Nov. 4, 2021

(30) Foreign Application Priority Data
Jul. 25, 2018 (JP) .................. 2018-139005

(51) Int. Cl.
*H04L 9/40* (2022.01)
*G06F 21/12* (2013.01)

(52) U.S. Cl.
CPC .......... *H04L 63/105* (2013.01); *G06F 21/121* (2013.01); *H04L 63/20* (2013.01); *H04L 63/083* (2013.01)

(58) Field of Classification Search
CPC ............................. H04L 63/105; G06F 21/121
(Continued)

(56) References Cited

U.S. PATENT DOCUMENTS

| 7,950,051 | B1 * | 5/2011 | Spitz | .................. | H04L 63/0846 |
| | | | | | 709/229 |
| 2004/0034792 | A1 | 2/2004 | Ueno | | |
| 2018/0178758 | A1 * | 6/2018 | Yamaguchi | ............. | H04M 1/00 |

FOREIGN PATENT DOCUMENTS

| JP | 2004-032403 A | 1/2004 |
| JP | 2016-119543 A | 6/2016 |
| JP | 2016-170672 A | 9/2016 |

OTHER PUBLICATIONS

International Search Report for PCT Application No. PCT/JP2019/028640, dated Oct. 15, 2019.
(Continued)

*Primary Examiner* — Anthony D Brown

(57) ABSTRACT

A communication device management device includes: at least one memory configured to store instructions; and at least one processor configured to execute the instructions to: detect a change in possibility/impossibility of communication with a communication device, based on a response from the communication device to a confirmation signal to be transmitted at every predetermined time; and perform, when a restriction is imposed on a predetermined function of the communication device in which the communication possibility/impossibility is changed from impossible to possible, the restriction after canceling the restriction of the communication device, and perform, when the restriction of the communication device is not imposed, the restriction of the communication device.

12 Claims, 14 Drawing Sheets

(58) Field of Classification Search
USPC .......................................................... 726/1
See application file for complete search history.

(56) References Cited

OTHER PUBLICATIONS

English translation of Written opinion for PCT Application No. PCT/JP2019/028640, dated Oct. 15, 2019.

* cited by examiner

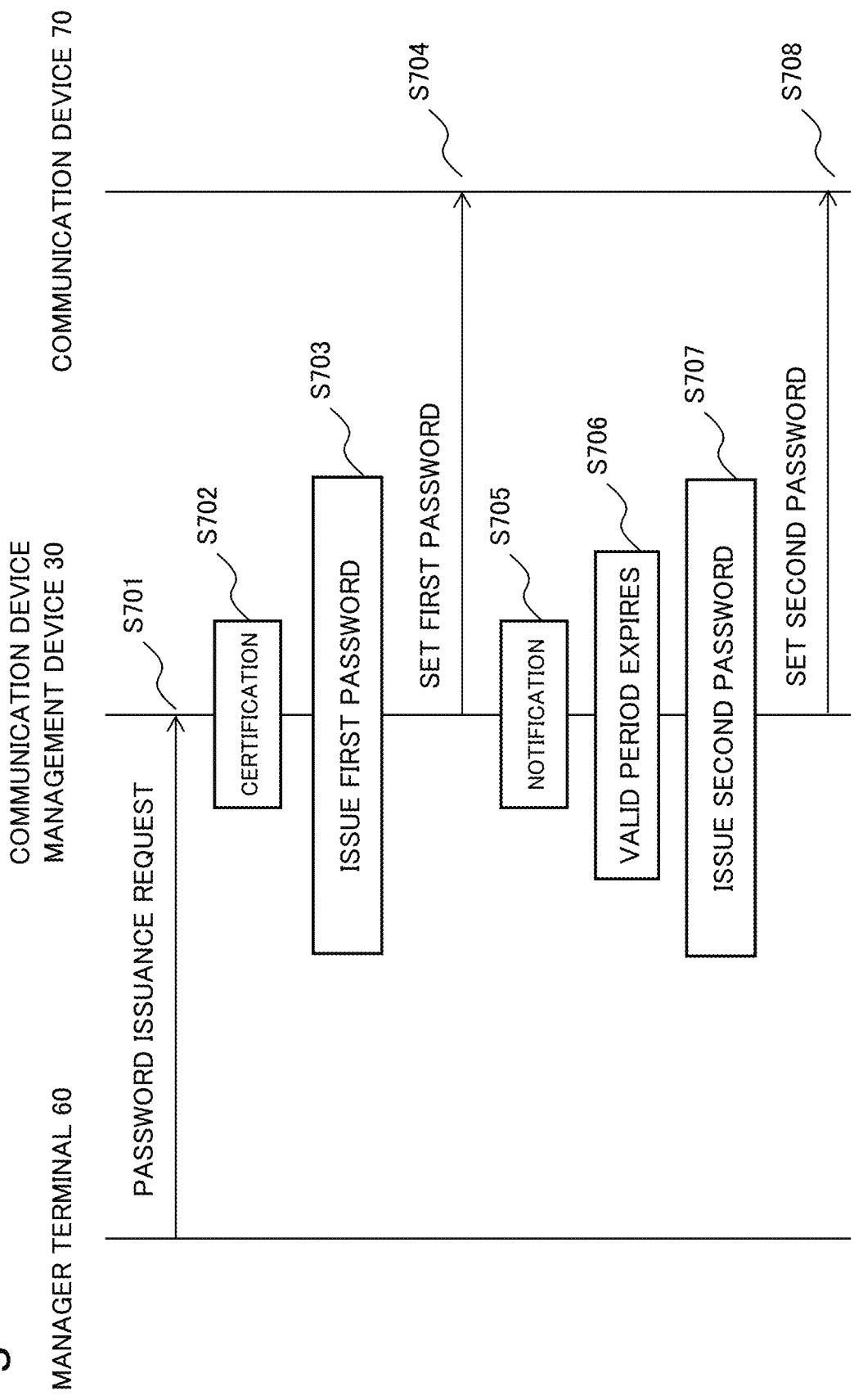

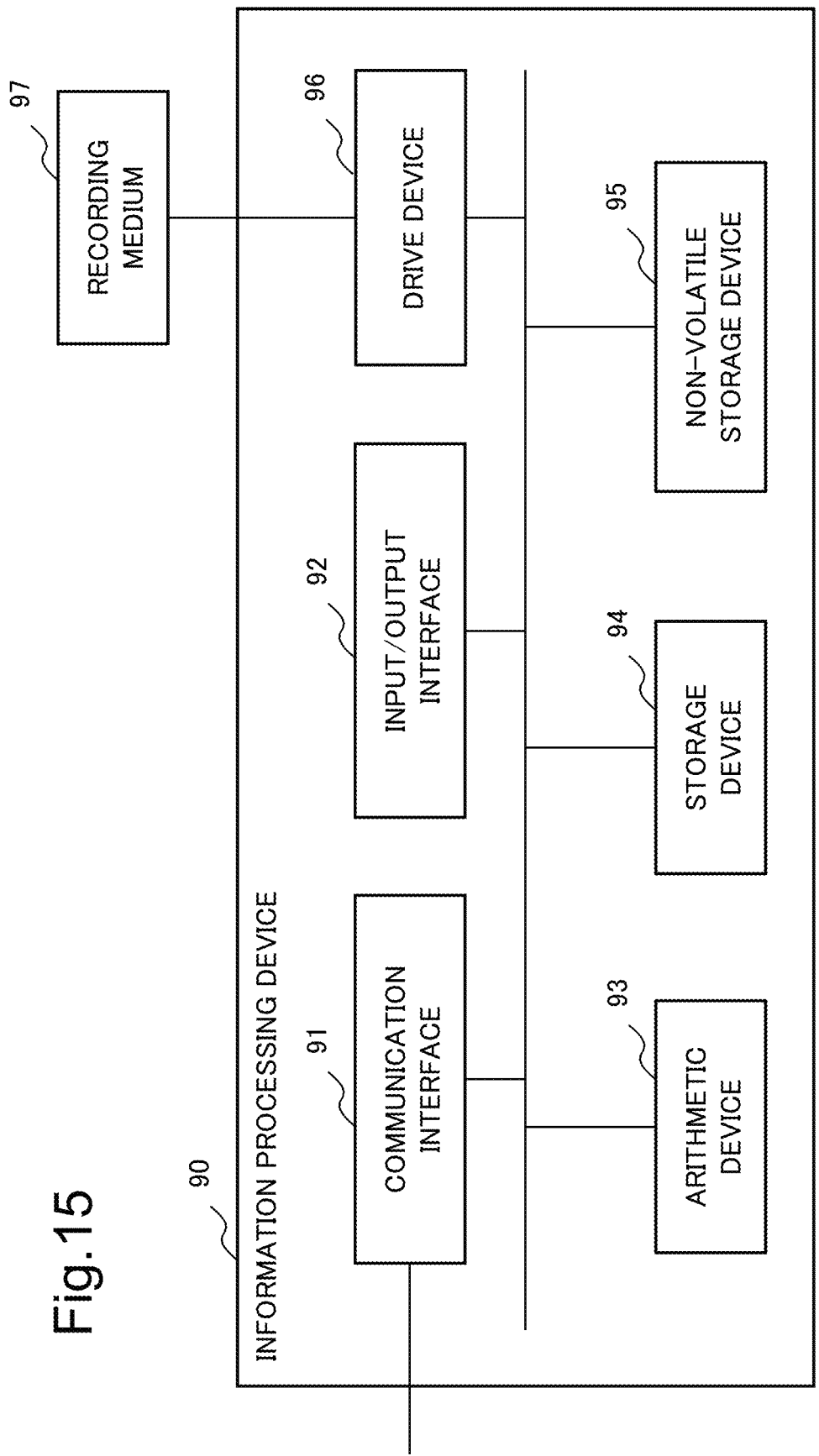

COMMUNICATION DEVICE MANAGEMENT DEVICE, SYSTEM, METHOD, AND NON-TRANSITORY COMPUTER-READABLE RECORDING MEDIUM

This application is a National Stage Entry of PCT/JP2019/028640 filed on Jul. 22, 2019, which claims priority from Japanese Patent Application 2018-139005 filed on Jul. 25, 2018, the contents of all of which are incorporated herein by reference, in their entirety.

TECHNICAL FIELD

The present disclosure relates to a communication device management device, a system, a method, and a recording medium.

BACKGROUND ART

As a method of avoiding unauthorized use of a communication device by stealing, there are, for example, methods described in PTLs 1 and 2.

In the method described in PTL 1, an initial state of an integrated circuit (IC) card is brought into a function restriction state, and a function restriction of the IC card is temporarily canceled from a terminal device via a non-contact interface. Accordingly, the IC card is brought into the function restriction state in case of stealing, and therefore, a possibility of unauthorized use of the IC card can be reduced.

In the method described in PTL 2, a state of a communication device immediately after starting is brought into a function restriction state, an activation request is transmitted to a server after the communication device is started, the server receiving the activation request transmits an activation instruction to the communication device, and the communication device receiving the activation instruction cancels the function restriction. Thereby, when the communication device is started in a state of being unable to communicate with the server, the communication device is brought into the function restriction state, and therefore, a possibility of unauthorized use of the communication device can be reduced.

CITATION LIST

Patent Literature

[PTL 1] Japanese Unexamined Patent Application Publication No. 2016-170672
[PTL 2] Japanese Unexamined Patent Application Publication No. 2016-119543

SUMMARY OF INVENTION

Technical Problem

However, in the method described in PTL 1, a terminal device cancels a function restriction of an IC card when a user operates the terminal device. Thus, when the method is applied to a communication device management device that manages a plurality of communication devices, a manager needs to operate the communication device management device and cancel a function restriction of the communication device at each starting of the communication device.

In the method described in PTL 2, a communication device notifies, after being started, a server of the starting, and thereby, the server detects the starting of the communication device. Thus, it is necessary to implement, in the communication device, a function of notifying the server of the starting of the communication device. In particular, when there are a plurality of types (different vendors or the like) of communication devices in a system, the function implementation is performed for each type of communication device, which is troublesome.

An object of the present disclosure is to provide a communication device management device, a system, a method, and a recording medium that enable reducing a possibility of unauthorized use of a communication device while reducing a trouble of a manager and function implementation.

Solution to Problem

In order to solve the above-mentioned problem, in one example embodiment of the present disclosure, a communication device management device includes: a communication possibility/impossibility detection means for detecting a change in possibility/impossibility of communication with a communication device, based on a response from the communication device to a confirmation signal to be transmitted at every predetermined time; and a device control means for performing, when a restriction is imposed on a predetermined function of the communication device in which the communication possibility/impossibility is changed from impossible to possible, the restriction after canceling the restriction of the communication device, and performing, when the restriction of the communication device is not imposed, the restriction of the communication device.

In another example embodiment of the present disclosure, a communication device management method includes: detecting a change in possibility/impossibility of communication with a communication device, based on a response from the communication device to a confirmation signal to be transmitted at every predetermined time; and performing, when a restriction is imposed on a predetermined function of the communication device in which the communication possibility/impossibility is changed from impossible to possible, the restriction after canceling the restriction of the communication device, and performing, when the restriction of the communication device is not imposed, the restriction of the communication device.

In another example embodiment of the present disclosure, a communication device management program stored in a non-transitory computer-readable recording medium causes a computer to achieve: a communication possibility/impossibility detection function of detecting a change in possibility/impossibility of communication with a communication device, based on a response from the communication device to a confirmation signal to be transmitted at every predetermined time; and a device control function of performing, when a restriction is imposed on a predetermined function of the communication device in which the communication possibility/impossibility is changed from impossible to possible, the restriction after canceling the restriction of the communication device, and performing, when the restriction of the communication device is not imposed, the restriction of the communication device.

Advantageous Effects of Invention

A communication device management device, a system, a method, and a recording medium according to the present disclosure enable reducing a possibility of unauthorized use of a communication device while reducing a trouble of a manager and function implementation.

BRIEF DESCRIPTION OF DRAWINGS

FIG. 14 is a diagram illustrating an operation example of the communication device management device according to the third example embodiment of the present disclosure.

FIG. 15 is a diagram illustrating a hardware configuration example according to each example embodiment of the present disclosure.

EXAMPLE EMBODIMENT

[First Example Embodiment]

A first example embodiment of the present disclosure is described.

Figure 1:
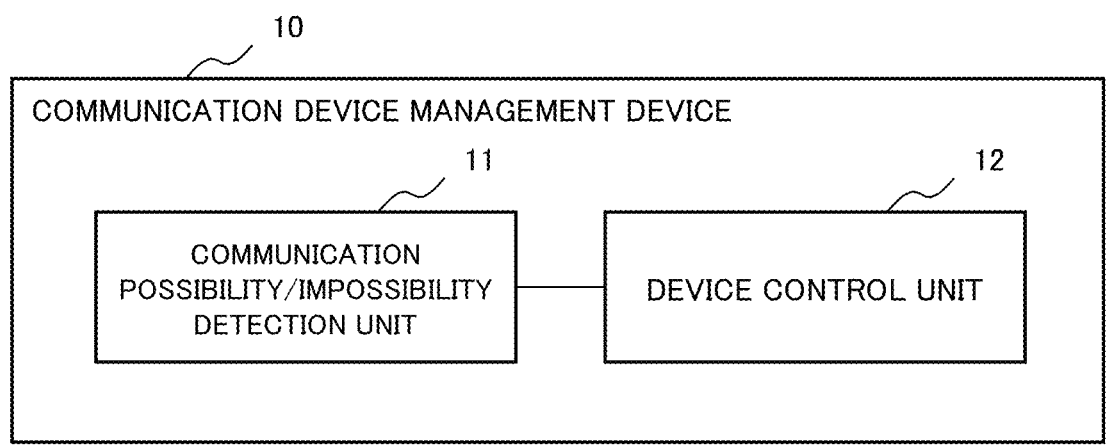
FIG. 1 is a diagram illustrating a configuration example of a communication device management device according to a first example embodiment of the present disclosure.

A configuration example of a communication device management device 10 according to the present example embodiment is illustrated in FIG. 1. The communication device management device 10 according to the present example embodiment includes a communication possibility/impossibility detection unit 11 and a device control unit 12.

The communication possibility/impossibility detection unit 11 detects a change in possibility/impossibility of communication with a communication device, based on a response from the communication device to a confirmation signal transmitted at every predetermined time.

When a restriction is imposed on a predetermined function of the communication device in which the communication possibility/impossibility is changed from impossible to possible, the device control unit 12 performs the restriction after canceling the restriction of the communication device, and, when the restriction of the communication device is not imposed, the device control unit 12 performs the restriction of the communication device.

By being configured in this way, the communication device management device 10 detects a change in possibility/impossibility of communication with a communication device, based on a response from the communication device to a confirmation signal transmitted at every predetermined time. Accordingly, since the communication device management device 10 can be informed of starting of the communication device without being operated by a manager, a trouble of a manager can be reduced. Moreover, since a response to a confirmation signal is used, a trouble of implementing a starting notification function in a communication device can be reduced. When a restriction is imposed on a predetermined function of the communication device in which the communication possibility/impossibility is changed from impossible to possible, the communication device management device 10 performs the restriction after canceling the restriction of the communication device, and, when the restriction of the communication device is not imposed, the communication device management device 10 performs the restriction of the communication device. Accordingly, since the predetermined function of the communication device is in a restricted state even when the communication device is stolen, it becomes possible to reduce a possibility of unauthorized use of the communication device. Thus, it becomes possible to reduce a possibility of unauthorized use of a communication device while reducing a trouble of a manager and function implementation.

Figure 2:
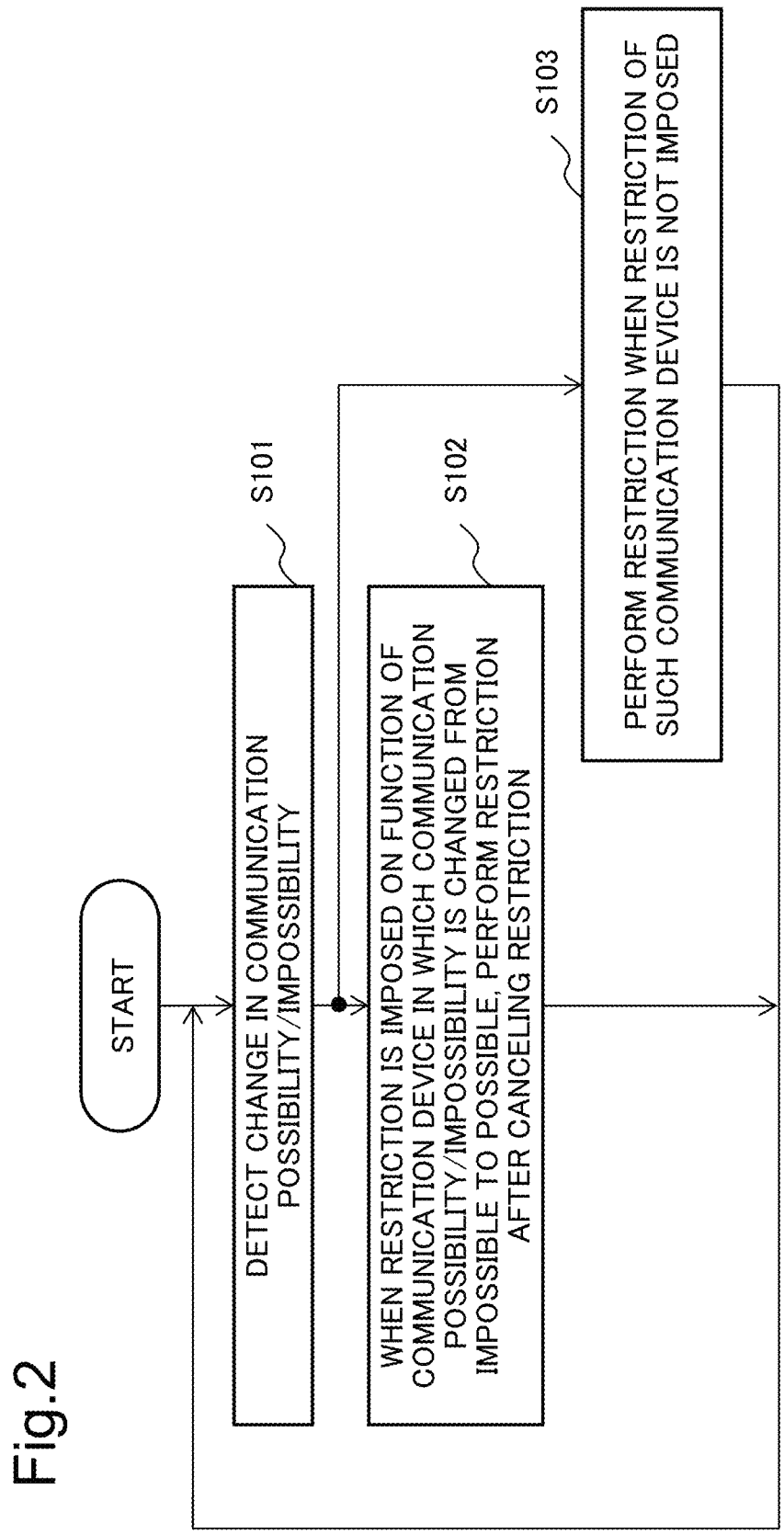
FIG. 2 is a diagram illustrating an operation example of the communication device management device according to the first example embodiment of the present disclosure.

Next, an example of an operation of the communication device management device 10 according to the present example embodiment is illustrated in FIG. 2.

The communication possibility/impossibility detection unit 11 detects a change in possibility/impossibility of communication with a communication device, based on a response from the communication device to a confirmation signal transmitted at every predetermined time (step S101). When a restriction is imposed on a predetermined function of the communication device in which the communication possibility/impossibility is changed from impossible to possible, the device control unit 12 performs the restriction after canceling the restriction of the communication device (step S102). When the restriction of the communication device is not imposed, the device control unit 12 performs the restriction of the communication device (step S103).

By operating in this way, the communication device management device 10 detects a change in possibility/impossibility of communication with a communication device, based on a response from the communication device to a confirmation signal transmitted at every predetermined time. When a restriction is imposed on a predetermined function of the communication device in which the communication possibility/impossibility is changed from impossible to possible, the communication device management device 10 performs the restriction after canceling the restriction of the communication device, and, when the restriction of the communication device is not imposed, the communication device management device 10 performs the restriction of the communication device. Thus, it becomes possible to reduce a possibility of unauthorized use of a communication device while reducing a trouble of a manager and function implementation.

As described above, according to the first example embodiment of the present disclosure, the communication device management device 10 detects a change in possibility/impossibility of communication with a communication device, based on a response from the communication device to a confirmation signal transmitted at every predetermined time. Accordingly, since the communication device management device 10 can be informed of starting of the communication device without being operated by a manager, a trouble of a manager can be reduced. Moreover, since a response to a confirmation signal is used, a trouble of implementing a starting notification function in a communication device can be reduced. When a restriction is imposed on a predetermined function of the communication device in which the communication possibility/impossibility is changed from impossible to possible, the communication device management device 10 performs the restriction after canceling the restriction of the communication device, and, when the restriction of the communication device is not imposed, the communication device management device 10 performs the restriction of the communication device. Accordingly, since the predetermined function of the communication device is in a restricted state even when the communication device is stolen, it becomes possible to reduce a possibility of unauthorized use of the communication device. Thus, it becomes possible to reduce a possibility of unauthorized use of a communication device while reducing a trouble of a manager and function implementation.

[Second Example Embodiment]

Next, a second example embodiment of the present disclosure is described. In the present example embodiment, a communication device management device 20 is specifically described.

Figure 3:
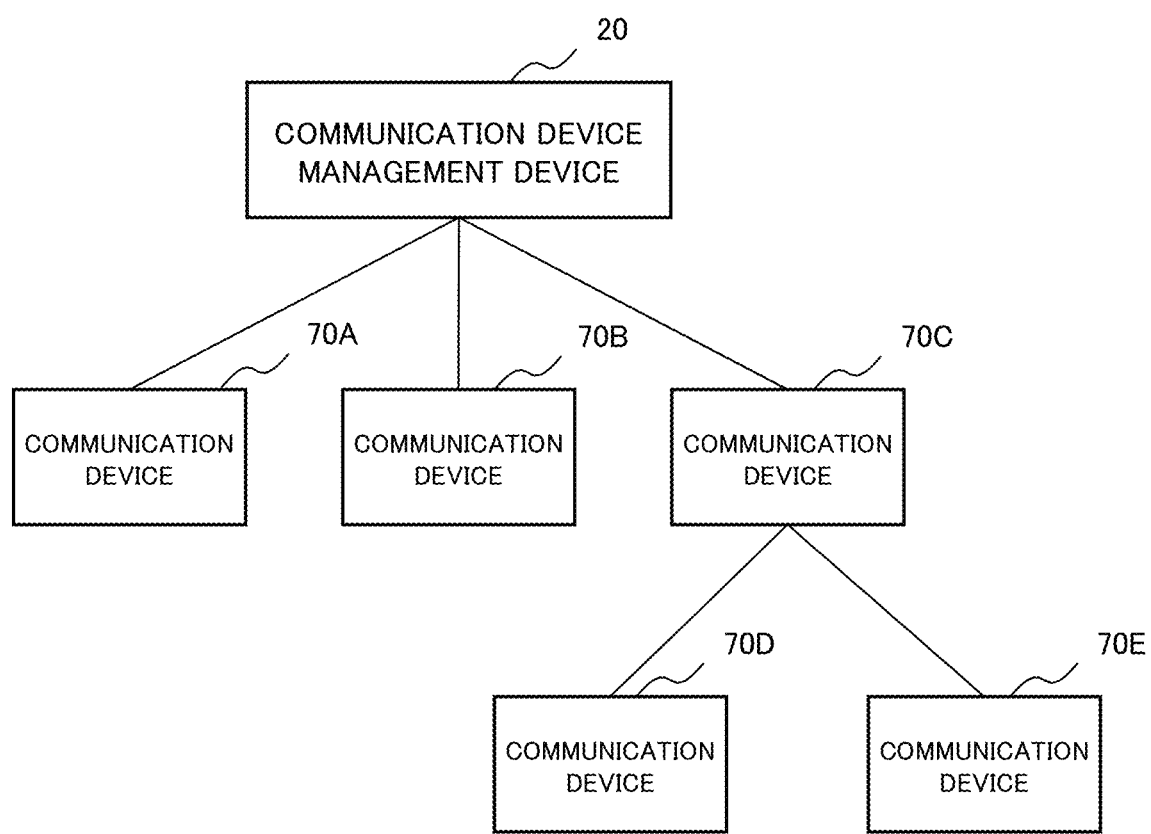
FIG. 3 is a diagram illustrating a configuration example of a communication device management system according to a second example embodiment of the present disclosure.

First, a configuration example of a communication device management system according to the present example embodiment is illustrated in FIG. 3. The communication device management system according to the present example embodiment includes the communication device management device 20 and communication devices 70A to 70E. The communication devices 70A to 70E are generically referred to as a communication device 70.

The communication device 70 is a communication device being a management target in the communication device management system. The communication device management device 20 is a device that manages the communication device 70. One or more communication devices 70 are capable of existing in the communication device management system. The communication device 70 is also capable of communicating with the communication device management device 20 via another communication device 70, instead of directly communicating with the communication device management device 20.

Figure 4:
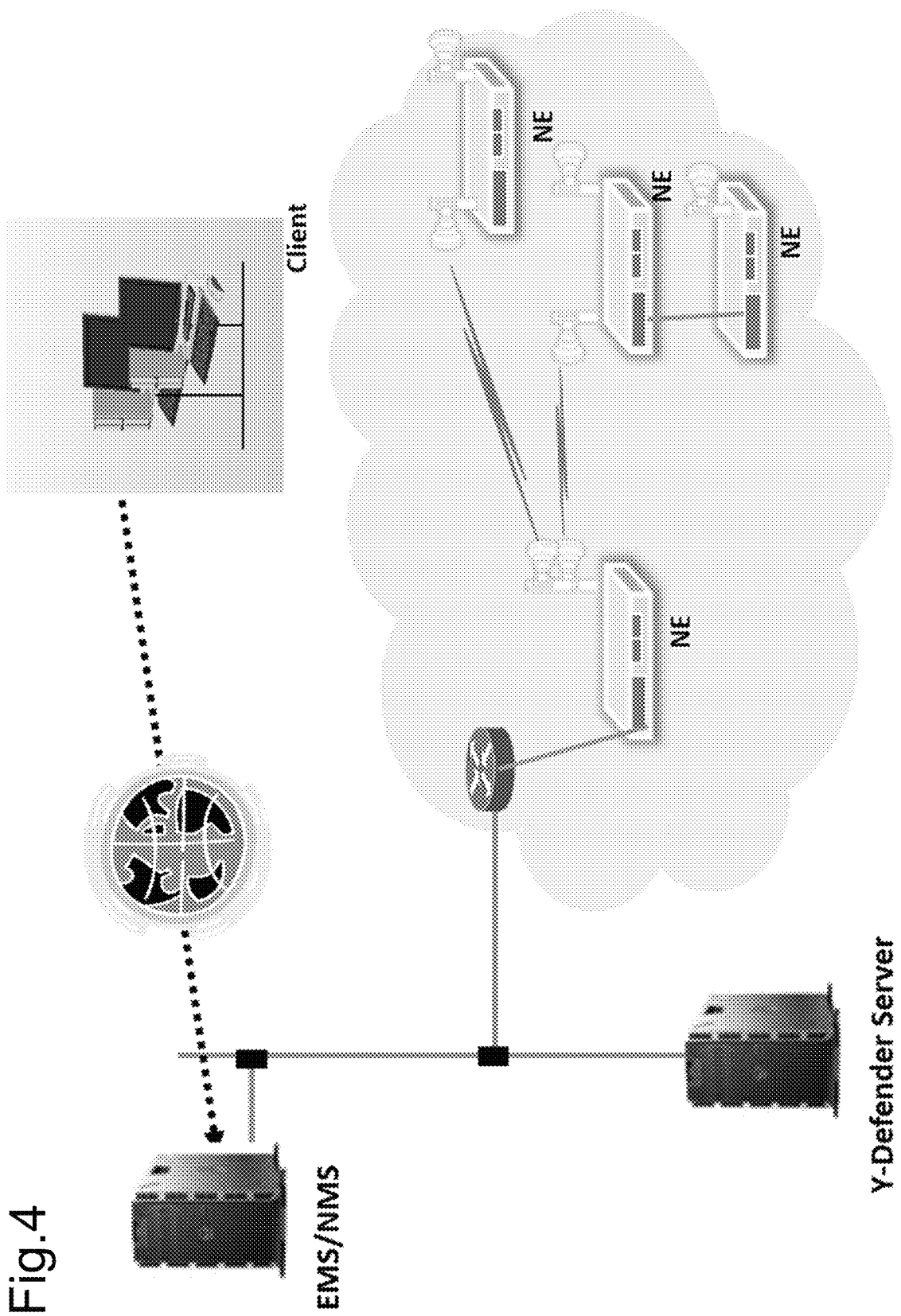
FIG. 4 is a diagram illustrating an example of an application system of the communication device management system according to the second example embodiment of the present disclosure.

An example of an application system of the communication device management system according to the present example embodiment is illustrated in FIG. 4. The system in FIG. 4 includes an element management system/network management system (EMS/NMS), a Y-Defender server, a client, and a network element (NE).

The EMS/NMS performs failure management, configuration management, accounting management, performance management, and confidentiality management. The client receives an input from a user, and performs display of network status. The NE connects to another NE in a wired or wireless way, and performs transmission of information.

In a case of the system in FIG. 4, the Y-Defender server is equivalent to the communication device management device 20 in FIG. 3, and the NE is equivalent to the communication device 70 in FIG. 3.

Figure 5:
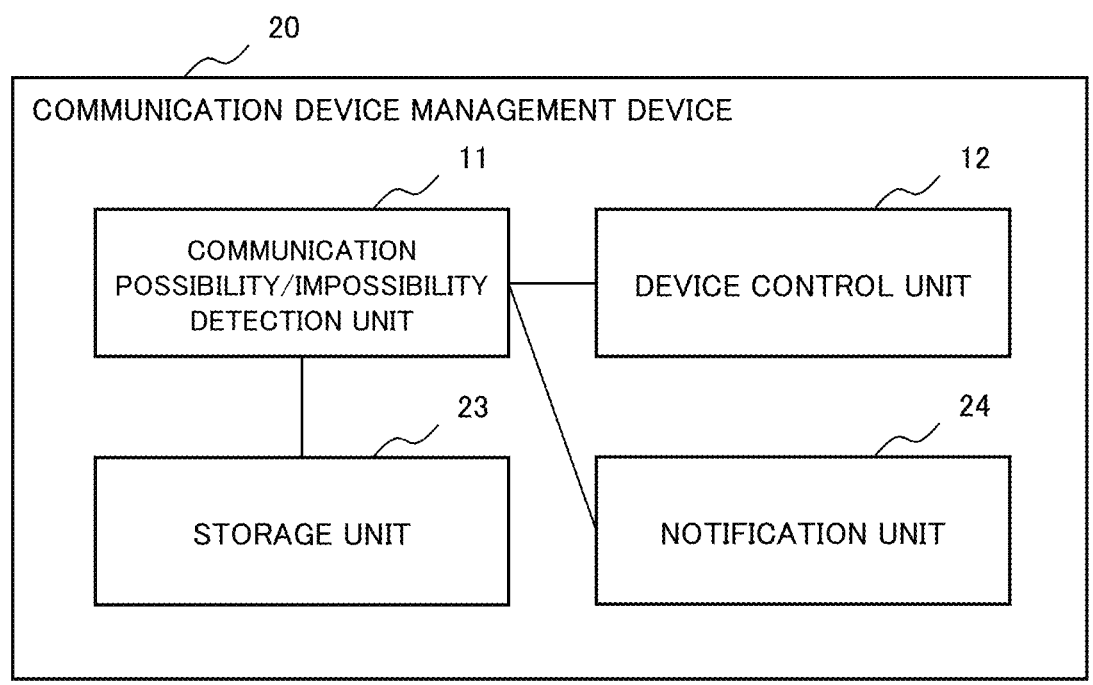
FIG. 5 is a diagram illustrating a configuration example of a communication device management device according to the second example embodiment of the present disclosure.

Next, a configuration example of the communication device management device 20 according to the present example embodiment is illustrated in FIG. 5.

A communication possibility/impossibility detection unit 11 detects a change in possibility/impossibility of communication with the communication device 70, based on a response from the communication device 70 to a confirmation signal transmitted at every predetermined time.

For example, the communication possibility/impossibility detection unit 11 transmits a confirmation signal at every predetermined time toward the communication device 70 being a management target previously set for the communication device management device 20 by the EMS/NMS or the like. Alternatively, the communication possibility/impossibility detection unit 11 may transmit a confirmation signal toward the communication device 70 in the communication device management system by multicast. The communication device 70 receiving the confirmation signal transmits a response to the communication device management device 20 being a transmission source of the confirmation signal.

It is assumed that the communication device 70 receiving the confirmation signal transfers, when there is another communication device 70 being capable of communicating with the communication device 70, a confirmation signal to the another communication device 70. It is assumed that the communication device 70 transfers, when receiving a response addressed to the communication device management device 20 from another communication device 70, the response received from the another communication device 70 toward the communication device management device 20.

An operation, by the communication possibility/impossibility detection unit 11, of transmitting a confirmation signal and receiving a response from the communication device 70 is hereinafter referred to as a health check.

As a result of a health check, the communication possibility/impossibility detection unit 11 stores, in a storage unit 23, for example, an identification information (media access control (MAC) address, an Internet protocol (IP) address, and the like of the communication device 70 that can receive the response.

At each health check, the communication possibility/impossibility detection unit 11 refers to a result of a previous health check stored in the storage unit 23, and confirms whether possibility/impossibility of communication with each of the communication devices 70 is not changed. For example, when a response can be received from the communication device 70 from which no response is received at a previous health check, the communication possibility/impossibility detection unit 11 determines that possibility/impossibility of communication with the communication device 70 is changed from impossible to possible. Whether a response is received can be determined by whether a response can be received by a predetermined timing between a previous health check and a current health check.

When a restriction is imposed on a predetermined function of the communication device 70 in which the communication possibility/impossibility is changed from impossible to possible, the device control unit 12 performs the restriction after canceling the restriction of the communication device 70, and, when the restriction of the communication device 70 is not imposed, the device control unit 12 performs the restriction of the communication device.

For example, it is assumed that the communication device 70 is a device that operates in a state where a function restriction is performed or in a state where a restriction is canceled depending on a soft key read at starting or at rereading. The soft key is a software key for performing a function restriction or a restriction cancellation of the communication device 70. The communication device 70 stores a soft key for a function restriction or a soft key for a restriction cancellation. The communication device 70 operates in a state where a function restriction is performed when a soft key read by the communication device 70 is for a function restriction, and the communication device 70 operates in a state where a restriction is canceled when a soft key read by the communication device 70 is for a restriction cancellation.

In this instance, the device control unit 12 determines whether a restriction is imposed on the communication device 70, depending on whether a soft key stored in the communication device 70 is for a function restriction or for a restriction cancellation. More specifically, it is assumed that the device control unit 12 determines that a restriction is imposed on the communication device 70 when a soft key stored in the communication device 70 is for a function restriction, and determines that a restriction is not imposed on the communication device 70 when a soft key is not for a function restriction.

The device control unit 12 can be informed of which soft key the communication device 70 stores, by, for example, reading a soft key stored in a read only memory (ROM) or the like of the communication device 70. Alternatively, the device control unit 12 may store, in the storage unit 23 of the communication device management device 20, which soft key is stored in the communication device 70.

The device control unit 12 cancels a restriction by storing a soft key for a restriction cancellation in the communication device 70 and causing the communication device 70 to reread the soft key. The device control unit 12 performs a restriction of the communication device 70 by storing a soft key for a function restriction in the communication device 70. Rereading of a soft key is optional when a restriction of the communication device 70 is performed. In a case where it is desired to perform a function restriction even when the communication device 70 and the communication device management device 20 are in a communicable state, the device control unit 12 may cause the communication device 70 to reread a soft key at a timing at which it is desired to perform a function restriction. When the communication device 70 does not perform rereading of a soft key, a function restriction is actually performed on the communication device 70 at a timing at which the communication device 70 is started next.

The communication device 70 is not limited to a device that operates in a state where a function restriction is performed or in a state where a restriction is canceled depending on a soft key read at starting or at rereading. For example, the communication device 70 may be a device that shifts between a function restriction state and a restriction cancellation state at a timing at which an instruction is received from the communication device management device 20.

A notification unit 24 notifies a predetermined notification destination when stealing of the communication device 70 is detected. For example, the notification unit 24 notifies a manager terminal in such a case that possibility/impossibility of communication with the communication device 70 is changed from impossible to possible.

By being configured in this way, the communication device management device 20 detects a change in possibility/impossibility of communication with a communication device, based on a response from the communication device to a confirmation signal transmitted at every predetermined time. Accordingly, since the communication device management device 20 can be informed of starting of the communication device without being operated by a manager, a trouble of a manager can be reduced. Moreover, since a response to a confirmation signal is used, a trouble of implementing a starting notification function in a communication device can be reduced. When a restriction is imposed on a predetermined function of the communication device in which the communication possibility/impossibility is changed from impossible to possible, the communication device management device 20 performs the restriction after canceling the restriction of the communication device, and, when the restriction of the communication device is not imposed, the communication device management device 20 performs the restriction of the communication device. Accordingly, since the predetermined function of the communication device is in a restricted state even when the communication device is stolen, it becomes possible to reduce a possibility of unauthorized use of the communication device. Thus, it becomes possible to reduce a possibility of unauthorized use of a communication device while reducing a trouble of a manager and function implementation.

Figure 6:
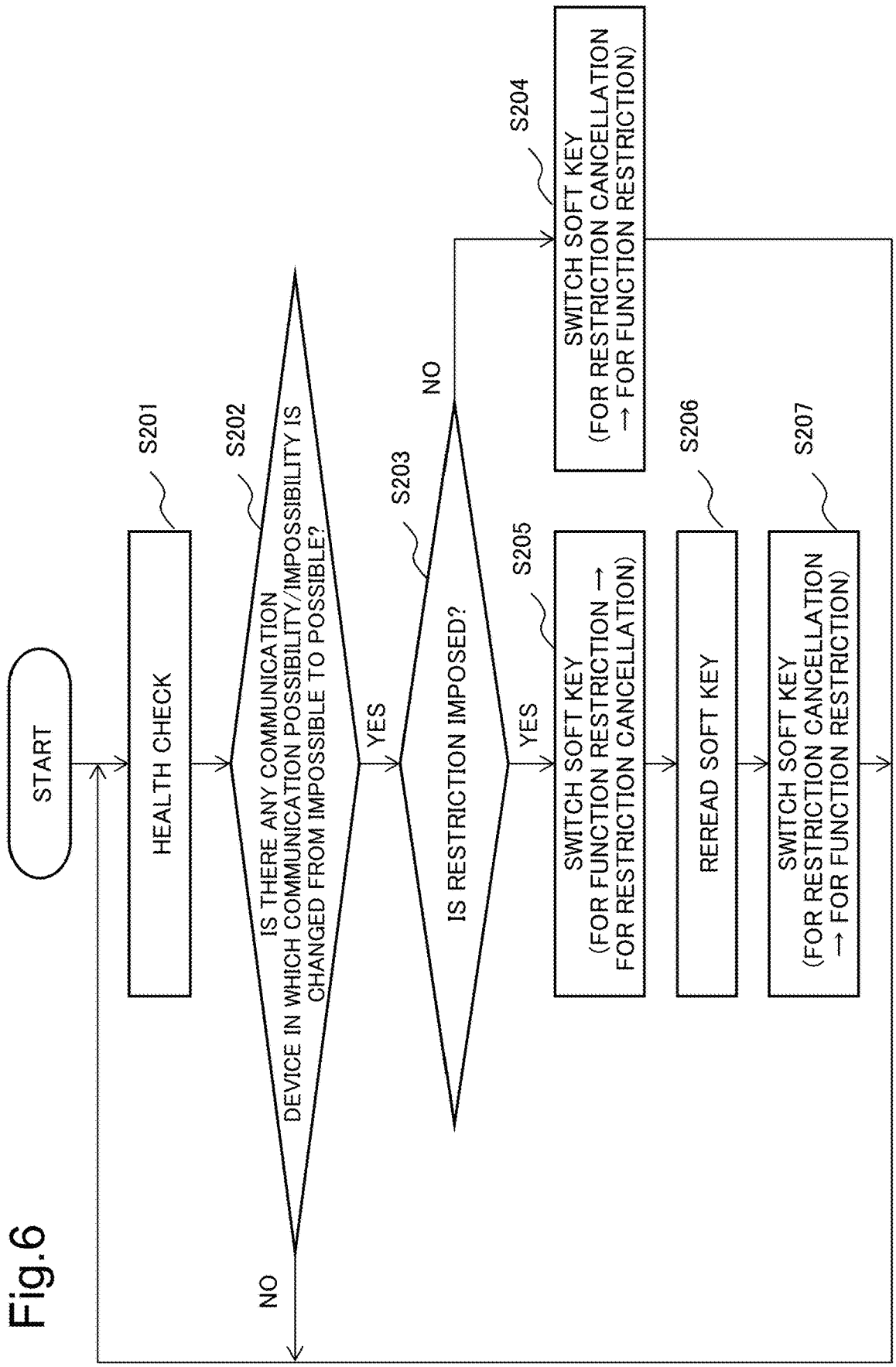
FIG. 6 is a diagram illustrating an operation example of the communication device management device according to the second example embodiment of the present invention.

Next. an operation example of the communication device management device 20 according to the present example embodiment is described by use of FIG. 6. It is assumed that the communication device 70 operates in a function restriction state and a restriction cancellation state depending on a soft key read at starting or at rereading.

Figure 7:
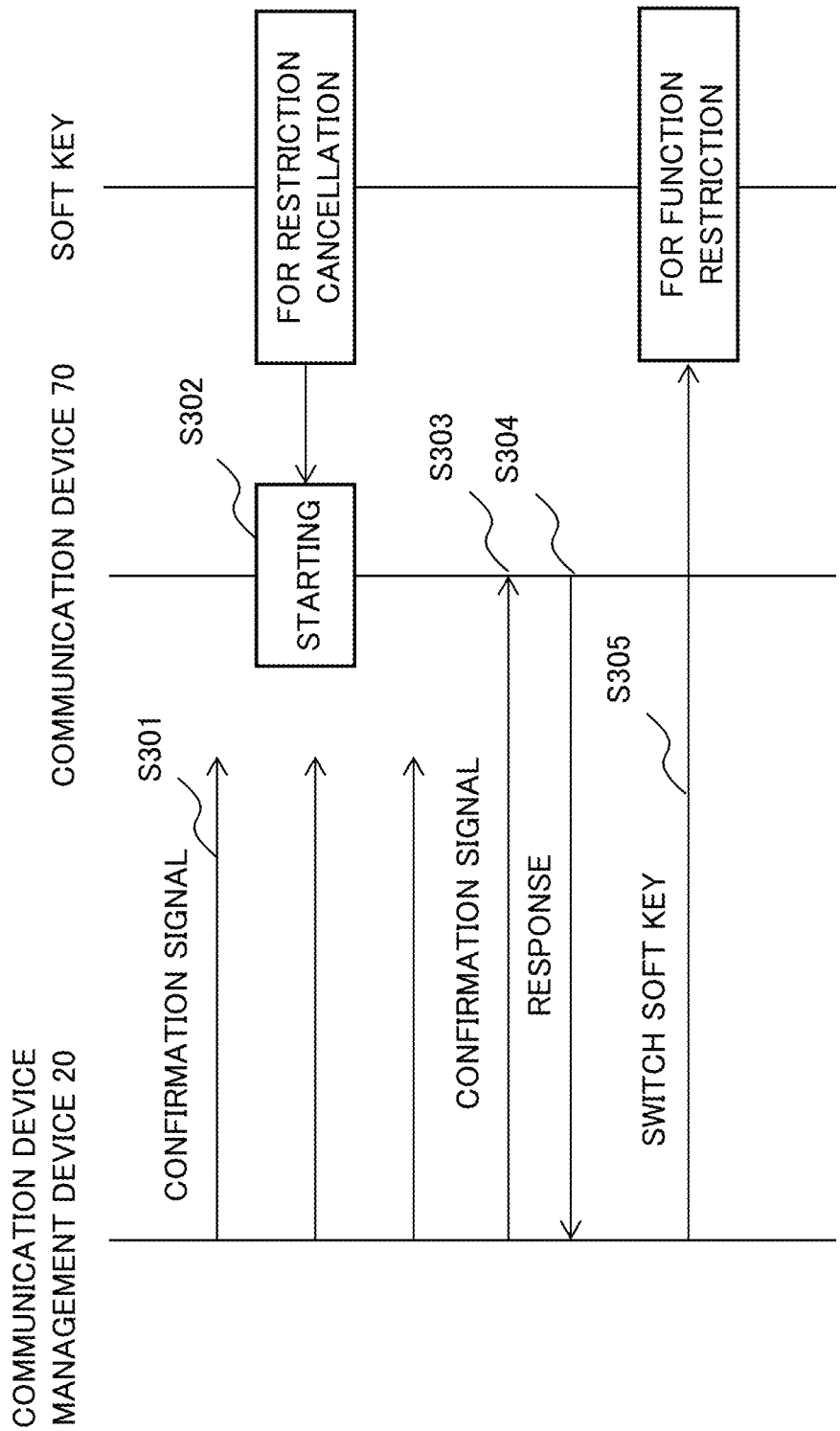
FIG. 7 is a diagram illustrating an operation example of the communication device management device according to the second example embodiment of the present disclosure.

First, an operation example when the communication device 70 is started for a first time is described by use of FIGS. 6 and 7. FIG. 7 is a diagram illustrating an example of a sequence of the communication device management system when the communication device 70 is started for a first time.

Although the communication device management device 20 performs a health check at every predetermined time, the communication device management device 20 is unable to receive a response before starting of the communication device 70 is completed (step S201 in FIG. 6, NO in step S202, and step S301 in FIG. 7).

At starting, the communication device 70 is started by reading a soft key for a restriction cancellation (step S302 in FIG. 7).

When starting of the communication device 70 is completed, the communication device 70 is brought into a restriction cancellation state. Since the communication device management device 20 receives a response from the communication device 70, the communication device management device 20 detects that possibility/impossibility of communication with the communication device 70 is changed from impossible to possible (YES in step S202 in FIG. 6, and steps S303 and S304 in FIG. 7).

Since a soft key of the communication device 70 is not for a function restriction (NO in step S203 in FIG. 6), the communication device management device 20 switches to a soft key for a function restriction (step S204 in FIG. 6 and step S305 in FIG. 7). In this instance, the soft key of the communication device 70 is switched to a soft key for a function restriction, but the communication device 70 operates in a restriction cancellation state until power is turned off. When it is desired to bring the communication device 70 into a function restriction state before power off, rereading of a soft key is requested from the communication device management device 20 to the communication device 70 at a timing at which it is desired to bring the communication device 70 into a function restriction state.

Figure 8:
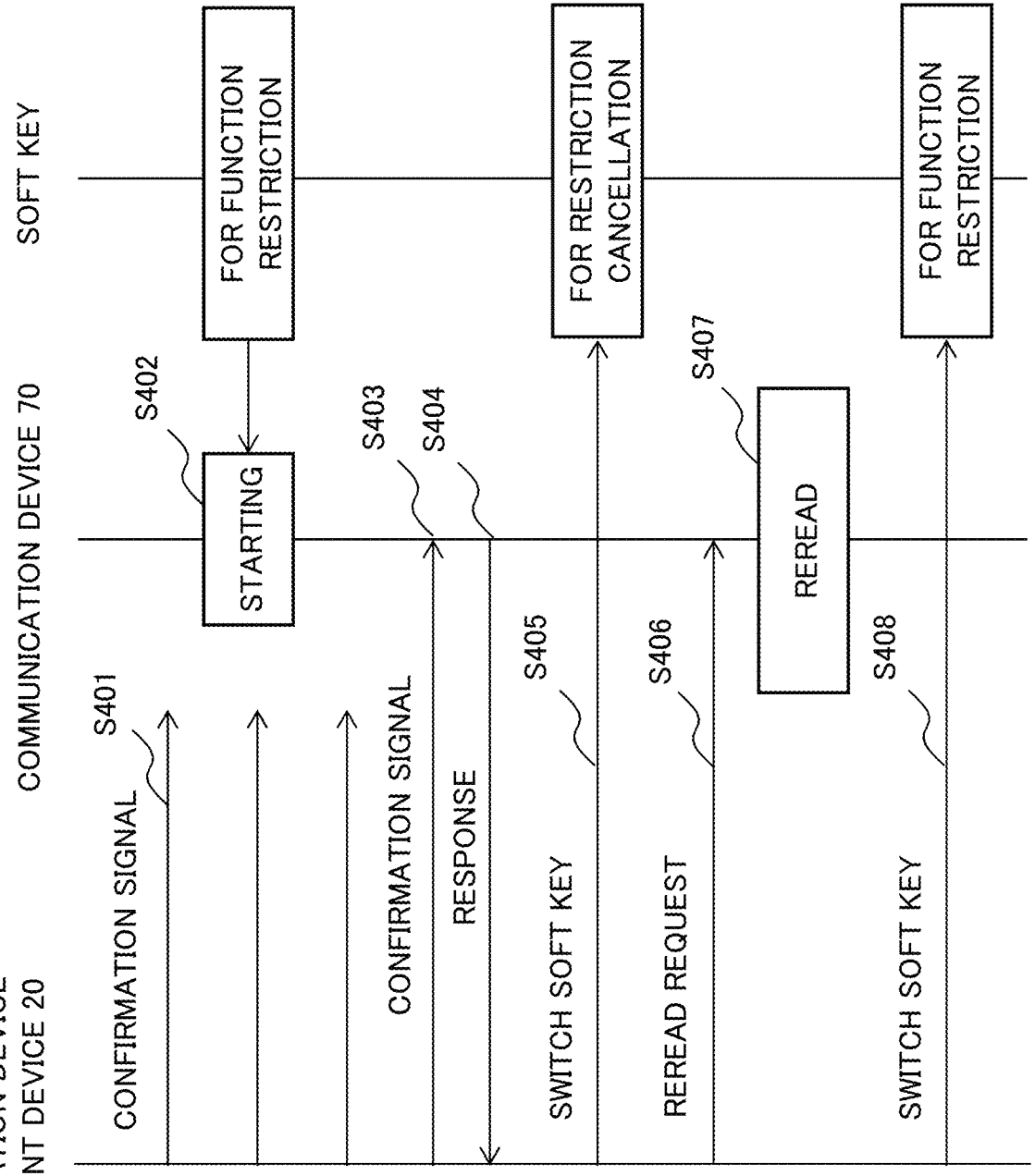
FIG. 8 is a diagram illustrating an operation example of the communication device management device according to the second example embodiment of the present disclosure.

Next, an operation example when the communication device 70 is started for or after a second time is described by use of FIGS. 6 and 8. FIG. 8 is a diagram illustrating an example of a sequence of the communication device management system when the communication device 70 is started for or after a second time.

Although the communication device management device 20 performs a health check at every predetermined time, the communication device management device 20 is unable to receive a response before starting of the communication device 70 is completed (step S201 in FIG. 6, NO in step S202, and step S401 in FIG. 8).

At starting, the communication device 70 is started by reading a soft key for a function restriction (step S402 in FIG. 8).

When starting of the communication device 70 is completed, the communication device 70 is brought into a function restriction state. Since the communication device management device 20 receives a response from the communication device 70, the communication device management device 20 detects that possibility/impossibility of communication with the communication device 70 is changed from impossible to possible (YES in step S202 in FIG. 6, and steps S403 and S404 in FIG. 8).

Since a soft key of the communication device 70 is for a function restriction (YES in step S203 in FIG. 6), the communication device management device 20 switches to a soft key for a restriction cancellation (step S205 in FIG. 6 and step S405 in FIG. 8). The communication device management device 20 requests the communication device 70 to reread a soft key (step S206 in FIG. 6 and step S406 in FIG. 8). By reading a soft key again, the communication device 70 is brought into a restriction cancellation state (step S407 in FIG. 8).

When rereading of a soft key is completed, the communication device management device 20 switches a soft key of the communication device 70 from a soft key for a restriction cancellation to a soft key for a function restriction (step S207 in FIG. 6 and step S408 in FIG. 8). In this instance, a soft key of the communication device 70 is switched to a soft key for a function restriction, but the communication device 70 operates in a restriction cancellation state until power is turned off. When it is desired to bring the communication device 70 into a function restriction state before power off, rereading of a soft key is requested from the communication device management device 20 to the communication device 70 at a timing at which it is desired to bring the communication device 70 into a function restriction state.

Figure 9:
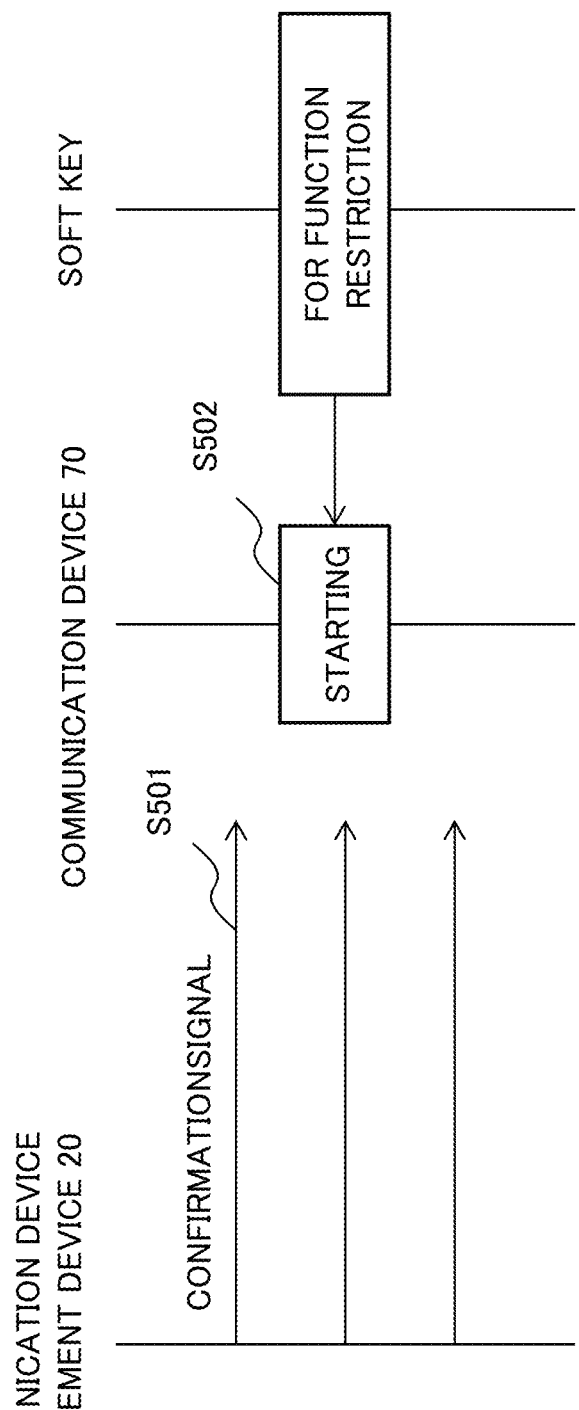
FIG. 9 is a diagram illustrating an operation example of the communication device management device according to the second example embodiment of the present disclosure.

Next, an operation example when the communication device management device 20 and the communication device 70 are unable to communicate (stealing is assumed) is described by use of FIGS. 6 and 9. FIG. 9 is a diagram illustrating an example of a sequence of the communication device management system when the communication device management device 20 and the communication device 70 are unable to communicate.

Although the communication device management device 20 performs a health check at every predetermined time, the communication device management device 20 is unable to receive a response (step S201 in FIG. 6, NO in step S202, and step S501 in FIG. 9).

At starting, the communication device 70 is started by reading a soft key for a function restriction (step S502 in FIG. 9).

When starting of the communication device 70 is completed, the communication device 70 is brought into a function restriction state. When the communication device management device 20 and the communication device 70 are in an incommunicable state, the communication device management device 20 is unable to receive a response from the communication device 70, and therefore, the communication device 70 remains in a function restriction state.

By operating in this way, the communication device management device 20 detects a change in possibility/impossibility of communication with a communication device, based on a response from the communication device to a confirmation signal transmitted at every predetermined time. When a restriction is imposed on a predetermined function of the communication device in which the communication possibility/impossibility is changed from impossible to possible, the communication device management device 20 performs the restriction after canceling the restriction of the communication device, and, when the restriction of the communication device is not imposed, the communication device management device 20 performs the restriction of the communication device. Thus, it becomes possible to reduce a possibility of unauthorized use of a communication device while reducing a trouble of a manager and function implementation.

As described above, according to the second example embodiment of the present disclosure, the communication device management device 20 detects a change in possibility/impossibility of communication with a communication device, based on a response from the communication device to a confirmation signal transmitted at every predetermined time. Accordingly, since the communication device management device 20 can be informed of starting of the communication device without being operated by a manager, a trouble of a manager can be reduced. Moreover, since a response to a confirmation signal is used, a trouble of implementing a starting notification function in a communication device can be reduced. When a restriction is imposed on a predetermined function of the communication device in which the communication possibility/impossibility is changed from impossible to possible, the communication device management device 20 performs the restriction after canceling the restriction of the communication device, and, when the restriction of the communication device is not imposed, the communication device management device 20 performs the restriction of the communication device. Accordingly, since the predetermined function of the communication device is in a restricted state even when the communication device is stolen, it becomes possible to reduce a possibility of unauthorized use of the communication device. Thus, it becomes possible to reduce a possibility of unauthorized use of a communication device while reducing a trouble of a manager and function implementation.

[Third Example Embodiment]

Next, a third example embodiment of the present disclosure is described. In the present example embodiment, a case where a password for a manager to access a communication device 70 is set for the communication device 70 is described.

Figure 10:
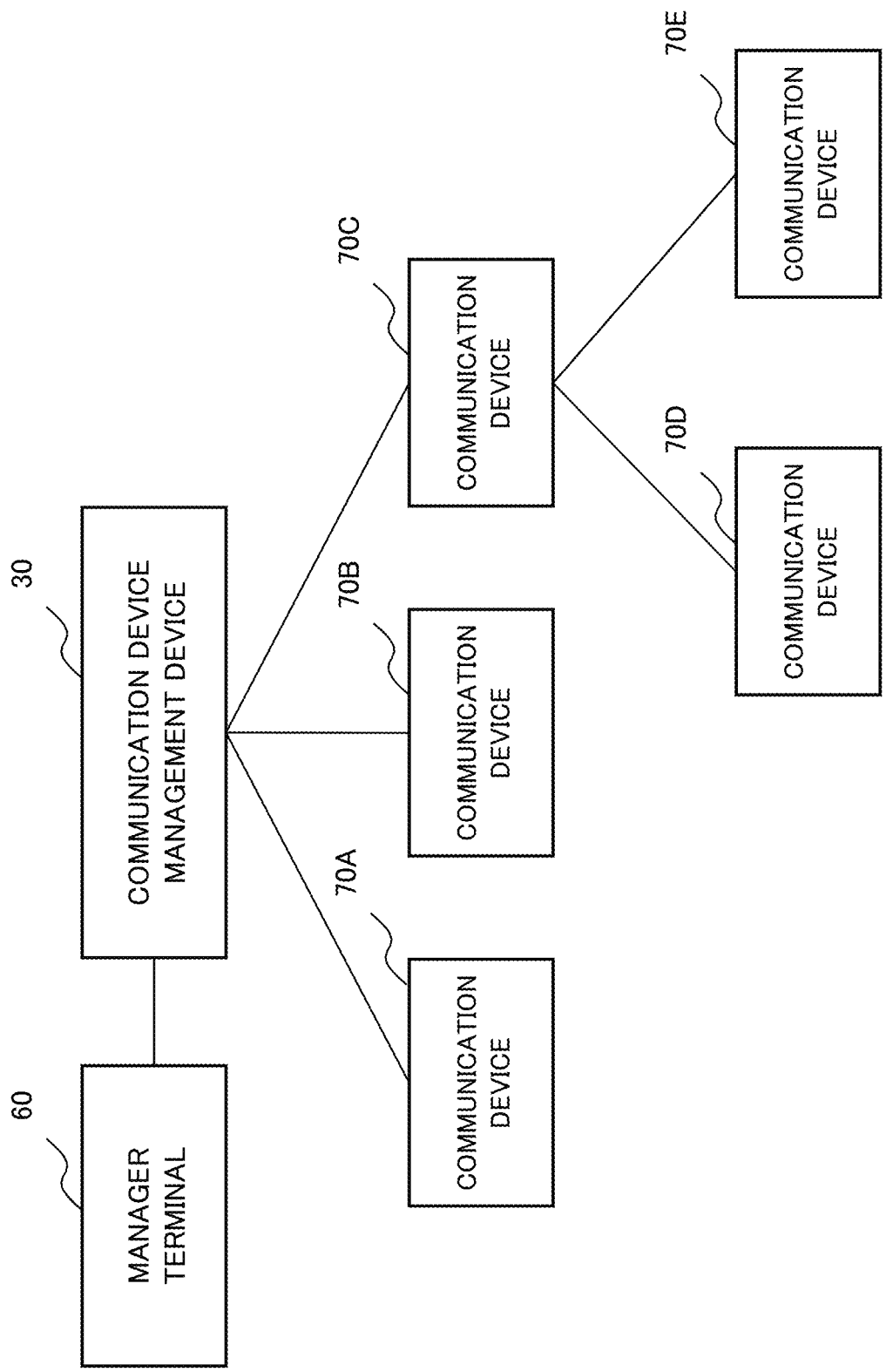
FIG. 10 is a diagram illustrating a configuration example of a communication device management system according to a third example embodiment of the present disclosure.

First, a configuration example of a communication device management system according to the present example embodiment is illustrated in FIG. 10. The configuration example of the communication device management system according to the present example embodiment is a configuration in which a manager terminal 60 is added to the configuration example (FIG. 3) of the communication device management system according to the second example embodiment. The manager terminal 60 is a terminal for requesting a communication device management device 30 to issue a password of the communication device 70 in such a case that a manager of the communication device management system desires to switch setting of the communication device 70. It is assumed that information on the manager terminal 60 being capable of requesting issuance of a password is previously set in the communication device management device 30.

Figure 11:
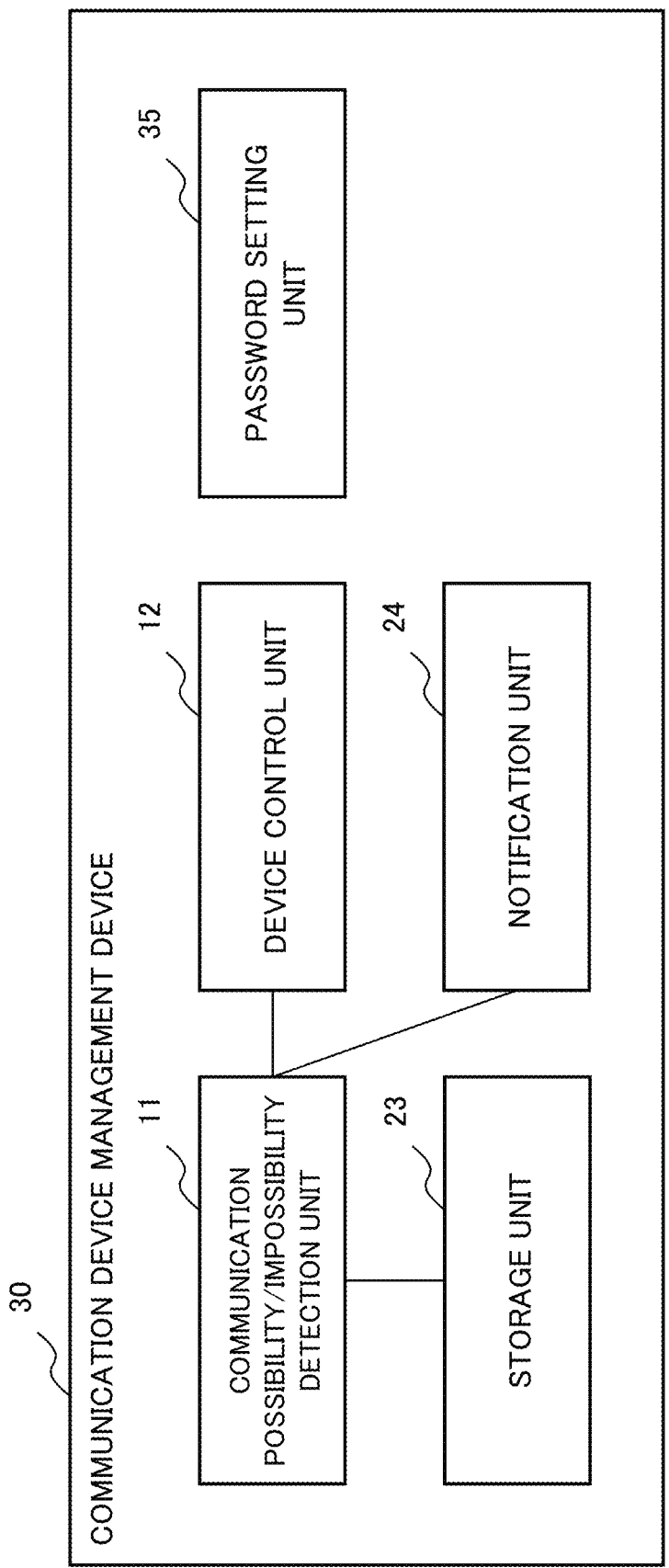
FIG. 11 is a diagram illustrating a configuration example of a communication device management device according to the third example embodiment of the present disclosure.

Next, a configuration example of the communication device management device 30 according to the present example embodiment is illustrated in FIG. 11. The configuration example of the communication device management device 30 according to the present example embodiment is a form in which a password setting unit 35 is added to the configuration example (FIG. 5) of the communication device management device 20 according to the second example embodiment. A communication possibility/impossibility detection unit 11, a device control unit 12, a storage unit 23, and the notification unit 24 are similar to those according to the second example embodiment, and therefore, description is omitted.

The password setting unit 35 receives a password issuance request from the manager terminal 60, and newly issues a first password when communication with the communication device 70 being a password issuance target is possible. The password setting unit 35 sets the first password for the communication device 70 being the password issuance target, and notifies a predetermined password notification destination of the first password. Whenever receiving a password issuance request from the manager terminal 60, the password setting unit 35 issues a new first password. A password notification destination may be the manager terminal 60, or may be a terminal that is not the manager terminal 60.

The first password is a password for a manager to access the communication device 70. After the password setting unit 35 sets the first password for the communication device 70, the manager accesses the communication device 70 by utilizing the first password, and becomes capable of performing setting switch or the like of the communication device 70.

The password setting unit 35 measures an elapsed time from issuance of the first password, and newly issues a second password when the elapsed time reaches a predetermined valid period. The password setting unit 35 sets the second password for the communication device 70. The password setting unit 35 also notifies the predetermined password notification destination that the valid period of the first password has expired.

The second password is a password that is not disclosed to another device except for the communication device 70, e.g., the manager terminal 60 or a password notification destination. Thus, after the password setting unit 35 sets the second password for the communication device 70, it is difficult even for not only a person committing stealing but also the manager to access the communication device 70.

Thus, when the communication device 70 is stolen after expiration of the valid period of the first password, access to the communication device 70 after stolen becomes difficult because the second password that is not disclosed is set for the communication device 70.

When the communication device 70 is stolen before expiration of the valid period of the first password, and the valid period is short (about 1 minute), it can be estimated that a person requesting issuance of a password has a high possibility of being a person committing stealing. Since a terminal that can request issuance of a password is limited to the manager terminal 60, a person having a possibility of committing stealing can be ascertained at an early stage.

When the communication device management device 30 and the communication device 70 are unable to communicate at setting of the second password, the communication device management device 30 is unable to set the second password for the communication device 70. However, when the communication device 70 is started in a state where the communication device management device 30 and the communication device 70 are unable to communicate, the communication device 70 is started in a function restriction state. Thus, when a restricted function includes a function of access to the communication device 70, access (setting switch or the like) to the communication device 70 restarted after stolen is restricted.

In order that access to the communication device 70 is not permitted even when the second password is accidentally input to the communication device 70, the password setting unit 35 may set a type of the first password/second password for the communication device 70 at setting of a password. In this case, while the second password is set, the communication device 70 does not permit access even when any password is input.

By being configured in this way, the communication device management device 30 detects a change in possibility/impossibility of communication with a communication device, based on a response from the communication device to a confirmation signal transmitted at every predetermined time. Accordingly, since the communication device management device 30 can be informed of starting of the communication device without being operated by a manager, a trouble of a manager can be reduced. Moreover, since a response to a confirmation signal is used, a trouble of implementing a starting notification function in a communication device can be reduced. When a restriction is imposed on a predetermined function of the communication device in which the communication possibility/impossibility is changed from impossible to possible, the communication device management device 30 performs the restriction after canceling the restriction of the communication device, and, when the restriction of the communication device is not imposed, the communication device management device 30 performs the restriction of the communication device. Accordingly, since the predetermined function of the communication device is in a restricted state even when the communication device is stolen, it becomes possible to reduce a possibility of unauthorized use of the communication device. Thus, it becomes possible to reduce a possibility of unauthorized use of a communication device while reducing a trouble of a manager and function implementation.

The communication device management device 30 according to the present example embodiment receives a password issuance request from the manager terminal 60, issues a first password and sets the first password for the communication device 70 when communication with the communication device 70 is possible, and notifies a predetermined password notification destination. When a valid period of the first password expires, a second password of which the password notification destination is not notified is set for the communication device 70. Thus, it becomes possible to reduce a possibility that the communication device 70 is subjected to setting switch after stolen, and ascertain a person having a possibility of committing stealing at an early stage.

Figure 12:
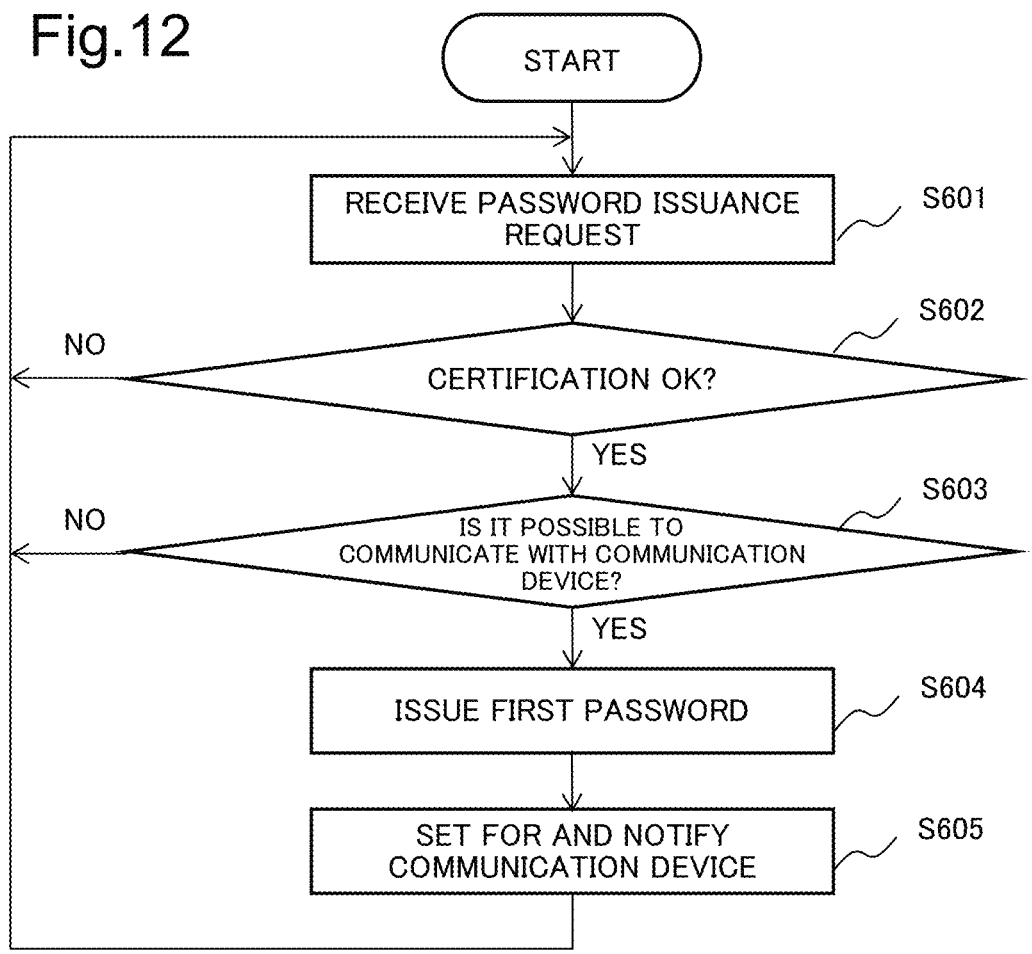
FIG. 12 is a diagram illustrating an operation example of the communication device management device according to the third example embodiment of the present invention.
Figure 13:
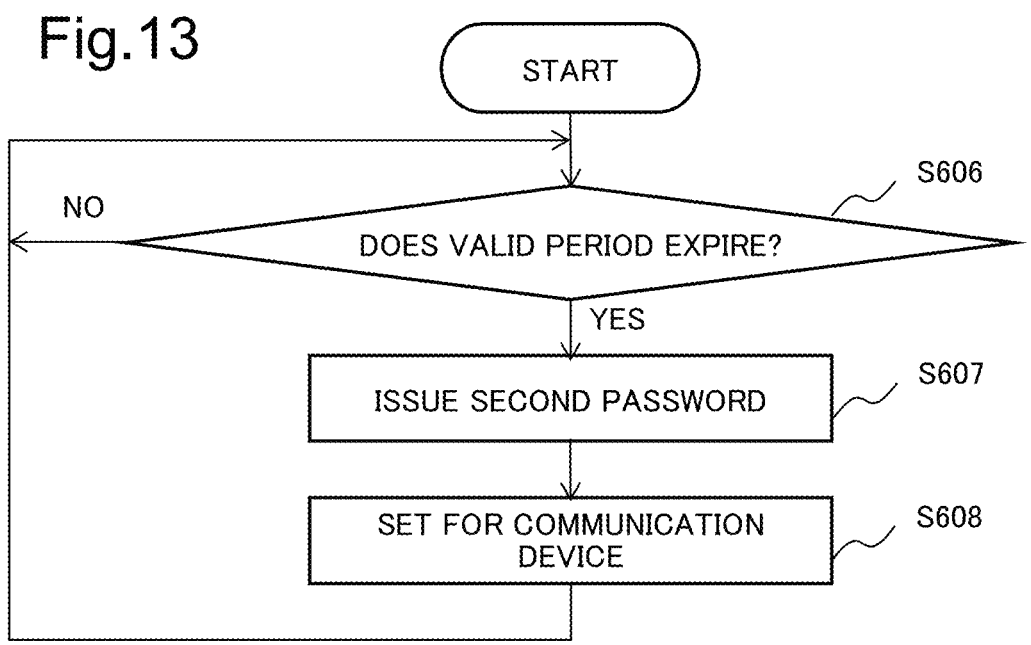
FIG. 13 is a diagram illustrating an operation example of the communication device management device according to the third example embodiment of the present disclosure.

Next, an operation example of the communication device management device 30 according to the present example embodiment is described by use of FIGS. 12 to 14. FIGS. 12 and 13 are an example of an operation performed by the communication device management device 30 in addition to the operation example in FIG. 6. FIG. 14 is an example of a sequence of the communication device management system according to the present example embodiment.

It is assumed that information on a valid period of the first password, a password notification destination, and the manager terminal 60 being capable of requesting issuance of a password is previously set in the communication device management device 30.

First, a manager operates the manager terminal 60, and requests the communication device management device 30 to issue a password of the communication device 70 (step S701 in FIG. 14). When receiving a password issuance request (step S601 in FIG. 12), the communication device management device 30 certifies whether a transmission source of the password issuance request is the manager terminal 60 being capable of requesting issuance of a password (step S702 in FIG. 14). When a transmission source of the password issuance request is not the manager terminal 60 being capable of requesting issuance of a password (NO in step S602 in FIG. 12), the communication device management device 30 notifies the transmission source of an error.

When a transmission source of the password issuance request is the manager terminal 60 being capable of requesting issuance of a password (YES in step S602 in FIG. 12), the communication device management device 30 confirms whether the communication device management device 30 is capable of communicating with the communication device 70 being a password issuance target. When being capable of communicating with the communication device 70 (YES in step S603), the communication device management device 30 issues a first password (step S604 in FIG. 12 and step S703 in FIG. 14). When being unable to communicate with the communication device 70 (NO in step S603 in FIG. 12), the communication device management device 30 notifies the transmission source of the password issuance request of an error. It is possible to determine whether the communication device management device 30 and the communication device 70 are communicable, based on a result of a health check by the communication possibility/impossibility detection unit 11.

The communication device management device 30 sets the first password for the communication device 70, and notifies a predetermined password notification destination of the first password (step S605 in FIG. 12 and steps S704 and S705 in FIG. 14). A password notification destination may be the manager terminal 60.

Thus, the manager becomes capable of accessing the communication device 70 by utilizing the first password.

When a valid period of the first password expires (YES in step S606 in FIG. 13 and step S706 in FIG. 14), the communication device management device 30 notifies the password notification destination of the expiration of the valid period. The communication device management device 30 newly issues a second password that is not disclosed (step S607 in FIG. 13 and step S707 in FIG. 14), and sets the second password for the communication device 70 (step S608 in FIG. 13 and step S708 in FIG. 14).

In this way, after the expiration of the valid period of the first password, access to the communication device 70 becomes difficult. When the second password is set for the communication device 70 but the communication device management device 30 is capable of communicating with the communication device 70, the communication device management device 30 is capable of accessing the communication device 70.

By operating in this way, the communication device management device 30 detects a change in possibility/impossibility of communication with a communication device, based on a response from the communication device to a confirmation signal transmitted at every predetermined time. When a restriction is imposed on a predetermined function of the communication device in which the communication possibility/impossibility is changed from impossible to possible, the communication device management device 30 performs the restriction after canceling the restriction of the communication device, and, when the restriction of the communication device is not imposed, the communication device management device 30 performs the restriction of the communication device. Thus, it becomes possible to reduce a possibility of unauthorized use of a communication device while reducing a trouble of a manager and function implementation.

As described above, according to the third example embodiment of the present disclosure, the communication device management device 30 detects a change in possibility/impossibility of communication with a communication device, based on a response from the communication device to a confirmation signal transmitted at every predetermined time. Accordingly, since the communication device management device 30 can be informed of starting of the communication device without being operated by a manager, a trouble of a manager can be reduced. Moreover, since a response to a confirmation signal is used, a trouble of implementing a starting notification function in a communication device can be reduced. When a restriction is imposed on a predetermined function of the communication device in which the communication possibility/impossibility is changed from impossible to possible, the communication device management device 30 performs the restriction after canceling the restriction of the communication device, and, when the restriction of the communication device is not imposed, the communication device management device 30 performs the restriction of the communication device. Accordingly, since the predetermined function of the communication device is in a restricted state even when the communication device is stolen, it becomes possible to reduce a possibility of unauthorized use of the communication device. Thus, it becomes possible to reduce a possibility of unauthorized use of a communication device while reducing a trouble of a manager and function implementation.

The communication device management device 30 according to the present example embodiment receives a password issuance request from the manager terminal 60, issues a first password and sets the first password for the communication device 70 when communication with the communication device 70 is possible, and notifies a predetermined password notification destination. When a valid period of the first password expires, a second password of which the password notification destination is not notified is set for the communication device 70. Thus, it becomes possible to reduce a possibility that the communication device 70 is subjected to setting switch after stolen, and ascertain a person having a possibility of committing stealing at an early stage.

[Hardware Configuration Example]

A configuration example of a hardware resource that achieves the communication device management device (10. 20, 30) according to each of the above-mentioned example embodiments of the present disclosure by use of one information processing device (computer) is described. The communication device management device may be achieved by physically or functionally utilizing at least two information processing devices. The communication device management device may be achieved as a dedicated device. Only part of a function of the communication device management device may be achieved by an information processing device.

FIG. 15 is a diagram schematically illustrating a hardware configuration example of an information processing device being capable of achieving the communication device management device according to each of the example embodiments of the present disclosure. An information processing device 90 includes a communication interface 91, an input/output interface 92, an arithmetic device 93, a storage device 94, a non-volatile storage device 95, and a drive device 96.

The communication interface 91 is a communication means for the communication device management device according to each of the example embodiments to communicate with an external device in a wired or wireless way. When the communication device management device is achieved by use of at least two information processing devices, the information processing devices may be connected to each other mutually communicably via the communication interface 91.

The input/output interface 92 is a man machine interface such as a keyboard being one example of an input device, or a display as an output device.

The arithmetic device 93 is an arithmetic processing device such as a general-purpose central processing unit (CPU) or a microprocessor. The arithmetic device 93 is capable of, for example, reading, in the storage device 94, various programs stored in the non-volatile storage device 95, and executing processing in accordance with the read program.

The storage device 94 is a memory device such as a random access memory (RAM) that is capable of being referred to from the arithmetic device 93, and stores a program, various data, and the like. The storage device 94 may be a volatile memory device.

The non-volatile storage device 95 is a non-volatile storage device such as a read only memory (ROM) or a flash memory, and is capable of storing various programs, data, and the like.

The drive device 96 is, for example, a device that processes reading and writing of data in a recording medium 97 described later.

The recording medium 97 is any recording medium being capable of recording data, such as an optical disc, magnet-optical disc, or a semiconductor flash memory.

Each of the example embodiments of the present disclosure may be achieved by, for example, configuring a communication device management device by the information processing device 90 illustrated in FIG. 15, and supplying the communication device management device with a program being capable of achieving the function described in each of the above-described example embodiments.

In this case, it is possible to achieve an example embodiment by executing, by the arithmetic device 93, the program supplied to the communication device management device.

It is also possible to configure, by the information processing device 90, not all but part of a function of the communication device management device.

Furthermore, the above-described program may be recorded in the recording medium 97, and may be configured to be suitably stored in the non-volatile storage device 95 at a shipment phase, an operating phase, or the like of the communication device management device. In this case, as a supply method of the above-described program, a method that installs in the communication device management device by using an appropriate jig at a manufacturing phase before shipment, an operating phase, or the like may be adopted. As a supply method of the above-described program, a general procedure such as a method that externally downloads via a communication line such as the Internet may be adopted.

Part or the whole of the above-described example embodiments is describable as, but not limited to, the following supplementary notes.

(Supplementary Note 1)

A communication device management device including:
a communication possibility/impossibility detection means for detecting a change in possibility/impossibility of communication with a communication device, based on a response from the communication device to a confirmation signal to be transmitted at every predetermined time; and
a device control means for performing, when a restriction is imposed on a predetermined function of the communication device in which the communication possibility/impossibility is changed from impossible to possible, the restriction after canceling the restriction of the communication device, and performing, when the restriction of the communication device is not imposed, the restriction of the communication device.

(Supplementary Note 2)

The communication device management device according to Supplementary Note 1, wherein
the communication device operates in a function restriction state where the restriction is performed on the function or in a restriction cancellation state where the restriction of the function is canceled, depending on a soft key read at starting or at rereading, and
the device control means determines that the restriction of the communication device is imposed when the soft key stored in the communication device is for a function restriction, and determines that the restriction of the communication device is not imposed when the soft key stored in the communication device is not for a function restriction.

(Supplementary Note 3)

The communication device management device according to Supplementary Note 2, wherein
the device control means performs the cancellation of the restriction by storing the soft key for a restriction cancellation in the communication device, and causing the communication device to perform the rereading of the soft key.

(Supplementary Note 4)

The communication device management device according to Supplementary Note 2 or 3, wherein
the device control means performs the restriction by storing the soft key for a function restriction in the communication device.

(Supplementary Note 5)

The communication device management device according to any one of Supplementary Notes 1 to 4, further including
 a password setting means for receiving, from a predetermined manager terminal, a password issuance request to the communication device, and when the possibility/impossibility of communication with the communication device is possible, issuing a first password, setting the first password for the communication device, and notifying a predetermined password notification destination of the first password, and further when a valid period of the first password expires, issuing a second password that is not disclosed to the password notification destination, and setting the second password for the communication device.

(Supplementary Note 6)

The communication device management device according to any one of Supplementary Notes 1 to 5, further including
 a notification means for notifying, when the possibility/impossibility of communication with the communication device is changed from possible to impossible, a predetermined notification destination of the change.

(Supplementary Note 7)

The communication device management device according to any one of Supplementary Notes 1 to 6, wherein
 the communication possibility/impossibility detection means determines that the possibility/impossibility of communication with the communication device is changed from impossible to possible when the response is received from the communication device that has not sent the response at previous transmission of the confirmation signal.

(Supplementary Note 8)

A communication device management system including:
 the communication device management device according to any one of Supplementary Notes 1 to 7; and
 the communication device.

(Supplementary Note 9)

A communication device management method including:
 detecting a change in possibility/impossibility of communication with a communication device, based on a response from the communication device to a confirmation signal to be transmitted at every predetermined time; and
 performing, when a restriction is imposed on a predetermined function of the communication device in which the communication possibility/impossibility is changed from impossible to possible, the restriction after canceling the restriction of the communication device, and performing, when the restriction of the communication device is not imposed, the restriction of the communication device.

(Supplementary Note 10)

The communication device management method according to Supplementary Note 9, wherein
 the communication device operates in a function restriction state where the restriction is performed on the function or in a restriction cancellation state where the restriction of the function is canceled, depending on a soft key read at starting or at rereading,
 the method further including determining that the restriction of the communication device is imposed when the soft key stored in the communication device is for a function restriction, and determining that the restriction of the communication device is not imposed when the soft key stored in the communication device is not for a function restriction.

(Supplementary Note 11)

The communication device management method according to Supplementary Note 10, further including
 performing the cancellation of the restriction by storing the soft key for a restriction cancellation in the communication device and causing the communication device to perform the rereading of the soft key.

(Supplementary Note 12)

The communication device management method according to Supplementary Note 10 or 11, further including
 performing the restriction by storing the soft key for a function restriction in the communication device.

(Supplementary Note 13)

The communication device management method according to any one of Supplementary Notes 9 to 12, further including
 receiving, from a predetermined manager terminal, a password issuance request to the communication device, and when the possibility/impossibility of communication with the communication device is possible, issuing a first password, setting the first password for the communication device, and notifying a predetermined password notification destination of the first password, and further when a valid period of the first password expires, issuing a second password that is not disclosed to the password notification destination, and setting the second password for the communication device.

(Supplementary Note 14)

The communication device management method according to any one of Supplementary Notes 9 to 13, further including
 notifying, when the possibility/impossibility of communication with the communication device is changed from possible to impossible, a predetermined notification destination of the change.

(Supplementary Note 15)

The communication device management method according to any one of Supplementary Notes 9 to 14, further including
 determining that the possibility/impossibility of communication with the communication device is changed from impossible to possible when the response is received from the communication device that has not sent the response at previous transmission of the confirmation signal.

(Supplementary Note 16)

A computer-readable recording medium recording a communication device management program causing a computer to achieve:
 a communication possibility/impossibility detection function of detecting a change in possibility/impossibility of communication with a communication device, based on a response from the communication device to a confirmation signal to be transmitted at every predetermined time; and
 a device control function of performing, when a restriction is imposed on a predetermined function of the communication device in which the communication possibility/impossibility is changed from impossible to possible, the restriction after canceling the restriction of the communication device, and performing, when the restriction of the communication device is not imposed, the restriction of the communication device.

(Supplementary Note 17)

The computer-readable recording medium recording the communication device management program according to Supplementary Note 16, wherein the communication device operates in a function restriction state where the restriction is performed on the function or in a restriction cancellation state where the restriction of the function is canceled, depending on a soft key read at starting or at rereading, and the device control function determines that the restriction of the communication device is imposed when the soft key stored in the communication device is for a function restriction, and determines that the restriction of the communication device is not imposed when the soft key stored in the communication device is not for a function restriction.

(Supplementary Note 18)

The computer-readable recording medium recording the communication device management program according to Supplementary Note 17, wherein the device control function performs the cancellation of the restriction by storing the soft key for a restriction cancellation in the communication device, and causing the communication device to perform the rereading of the soft key.

(Supplementary Note 19)

The computer-readable recording medium recording the communication device management program according to Supplementary Note 17 or 18, wherein the device control function performs the restriction by storing the soft key for a function restriction in the communication device.

(Supplementary Note 20)

The computer-readable recording medium recording the communication device management program according to any one of Supplementary Notes 16 to 19, further causing a computer to achieve a password setting function of receiving, from a predetermined manager terminal, a password issuance request to the communication device, and when the possibility/impossibility of communication with the communication device is possible, issuing a first password, setting the first password for the communication device, and notifying a predetermined password notification destination of the first password, and further when a valid period of the first password expires, issuing a second password that is not disclosed to the password notification destination, and setting the second password for the communication device.

(Supplementary Note 21)

The computer-readable recording medium recording the communication device management program according to any one of Supplementary Notes 16 to 20, further causing a computer to achieve a notification function of notifying, when the possibility/impossibility of communication with the communication device is changed from possible to impossible, a predetermined notification destination of the change.

(Supplementary Note 22)

The computer-readable recording medium recording the communication device management program according to any one of Supplementary Notes 16 to 21, wherein the communication possibility/impossibility detection function determines that the possibility/impossibility of communication with the communication device is changed from impossible to possible when the response is received from the communication device that has not sent the response at previous transmission of the confirmation signal.

While the disclosure has been particularly shown and described with reference to exemplary embodiments thereof, the disclosure is not limited to these embodiments. It will be understood by those of ordinary skill in the art that various changes in form and details may be made therein without departing from the spirit and scope of the present disclosure as defined by the claims.

This application is based upon and claims the benefit of priority from Japanese patent application No. 2018-139005, filed on Jul. 25, 2018, the disclosure of which is incorporated herein in its entirety by reference.

REFERENCE SIGNS LIST 10, 20, 30 Communication device management device
11 Communication possibility/impossibility detection unit
12 Device control unit
23 Storage unit
24 Notification unit
35 Password setting unit
60 Manager terminal
70 Communication device
90 Information processing device
91 Communication interface
92 Input/output interface
93 Arithmetic device
94 Storage device
95 Non-volatile storage device
96 Drive device
97 Recording medium

What is claimed is:

1. A communication device management device comprising:

at least one memory configured to store instructions; and at least one processor configured to execute the instructions to:

detect a change in a communication state as to a communication device, based on a response from the communication device to a confirmation signal transmitted at every predetermined time, the communication state indicating whether communication with the communication device is able to be achieved;

store, when a soft key stored in the communication device as to which the communication state has changed from not being able to be achieved to being able to be achieved is for a function restriction, the soft key for a function restriction in the communication device after canceling the restriction of the communication device; and store, when the soft key stored in the communication device is not for the function restriction, the soft key for the function restriction in the communication device, wherein the communication device operates in a function restriction state in which a restriction is performed on a predetermined function or in a restriction cancellation state in which the restriction of the function is cancelled, depending on the soft key read at starting or at rereading, and wherein the communication state is detected as changing from indicating that the communication is not able to be achieved to indicating that the communication is able to be achieved when the response has been received from the communication device in response to a most recently sent confirmation signal after no response had been received from the communication device in response to a previously sent confirmation signal.

2. The communication device management device according to claim 1, wherein
cancellation of the restriction is performed by storing the soft key for a restriction cancellation in the communication device, and causing the communication device to perform the rereading of the soft key.

3. The communication device management device according to claim 1, wherein
the at least one processor is further configured to execute the instructions to:
receive, from a predetermined manager terminal, a password issuance request to the communication device;
when the communication state indicates that the communication with the communication device is able to be achieved, issue a first password, set the first password for the communication device, and notify a predetermined password notification destination of the first password; and
when a valid period of the first password expires, issue a second password that is not disclosed to the password notification destination, and set the second password for the communication device.

4. The communication device management device according to claim 1, wherein
the at least one processor is further configured to execute the instructions to:
notify, when the communication state changes from indicating that the communication with the communication device is able to be achieved to indicating that the communication with the communication device is not able to be achieved, a predetermined notification destination of the change.

5. A communication device management method comprising:
detecting a change in a communication state as to a communication device, based on a response from the communication device to a confirmation signal transmitted at every predetermined time, the communication state indicating whether communication with the communication device is able to be achieved;
storing, when a soft key stored in the communication device as to which the communication state has changed from not being able to be achieved to being able to be achieved is for a function restriction, the soft key for a function restriction in the communication device after canceling the restriction of the communication device; and
storing, when the soft key stored in the communication device is not imposed, the restriction of for the function restriction, the soft key for the function restriction in the communication device,
wherein the communication device operates in a function restriction state in which a restriction is performed on a predetermined function or in a restriction cancellation state in which the restriction of the function is cancelled, depending on the soft key read at starting or at rereading, and
wherein the communication state is detected as changing from indicating that the communication is not able to be achieved to indicating that the communication is able to be achieved when the response has been received from the communication device in response to a most recently sent confirmation signal after no response had been received from the communication device in response to a previously sent confirmation signal.

6. The communication device management method according to claim 5, wherein
cancellation of the restriction is performed by storing the soft key for a restriction cancellation in the communication device and causing the communication device to perform the rereading of the soft key.

7. The communication device management method according to claim 5, further comprising:
receiving, from a predetermined manager terminal, a password issuance request to the communication device;
when the communication state indicates that the communication with the communication device is able to be achieved, issuing a first password, setting the first password for the communication device, and notifying a predetermined password notification destination of the first password; and
when a valid period of the first password expires, issuing a second password that is not disclosed to the password notification destination, and setting the second password for the communication device.

8. The communication device management method according to claim 5, further comprising:
notifying, when the communication state changes from indicating that the communication with the communication device is able to be achieved to indicating that the communication with the communication device is not able to be achieved, a predetermined notification destination of the change.

9. A non-transitory computer-readable recording medium storing a communication device management program executable by a computer to achieve:
detecting a change in a communication state as to a communication device, based on a response from the communication device to a confirmation signal transmitted at every predetermined time, the communication state indicating whether communication with the communication device is able to be achieved;
storing, when a soft key stored in the communication device as to which the communication state has changed from not being able to be achieved to being able to be achieved is for a function restriction, the soft key for a function restriction in the communication device after canceling the restriction of the communication device; and
storing, when the soft key stored in the communication device is not for the function restriction, the soft key for the function restriction in the communication device,
wherein the communication device operates in a function restriction state in which a restriction is performed on a predetermined function or in a restriction cancellation state in which the restriction of the function is cancelled, depending on the soft key read at starting or at rereading, and
wherein the communication state is detected as changing from indicating that the communication is not able to be achieved to indicating that the communication is able to be achieved when the response has been received from the communication device in response to a most recently sent confirmation signal after no response had been received from the communication device in response to a previously sent confirmation signal.

10. The non-transitory computer-readable recording medium recording the communication device management program according to claim 9, wherein
cancellation of the restriction is performed by storing the soft key for a restriction cancellation in the communication device, and causing the communication device to perform the rereading of the soft key.

11. The non-transitory computer-readable recording medium according to claim 9, wherein the communication device management program is executable by the computer to further achieve:
receiving, from a predetermined manager terminal, a password issuance request to the communication device;
when the communication state indicates that the communication with the communication device is able to be achieved, issuing a first password, setting the first password for the communication device, and notifying a predetermined password notification destination of the first password; and
when a valid period of the first password expires, issuing a second password that is not disclosed to the password notification destination, and setting the second password for the communication device.

12. The non-transitory computer-readable recording medium according to claim 9, wherein the communication device management program is executable by the computer to further achieve:
notifying, when the communication state changes from indicating that the communication with the communication device is able to be achieved to indicating that the communication with the communication device is not able to be achieved, a predetermined notification destination of the change.

* * * * *